(12) United States Patent
Matlock

(10) Patent No.: US 6,732,472 B1
(45) Date of Patent: May 11, 2004

(54) SMALL ANIMAL TRAP SYSTEM

(76) Inventor: Harold C. Matlock, Box 393, Debolt, Alberta (CA), TOH 11B0

( * ) Notice: Subject to any disclaimer, the term of this patent is extended or adjusted under 35 U.S.C. 154(b) by 0 days.

(21) Appl. No.: 10/279,608

(22) Filed: Oct. 24, 2002

(51) Int. Cl.[7] .............................................. A01M 23/24
(52) U.S. Cl. ............................... 43/85; 43/81; 43/81.5; 43/88
(58) Field of Search ................. 43/77, 80, 81, 43/81.5, 82, 85, 88, 89, 93

(56) References Cited

U.S. PATENT DOCUMENTS

| | | | | |
|---|---|---|---|---|
| 218,532 A | * | 8/1879 | Hooker | 43/85 |
| 295,486 A | * | 3/1884 | Cushing et al. | 43/81 |
| 621,396 A | * | 3/1899 | Williams | 43/81 |
| 680,114 A | * | 8/1901 | Bloker | 43/85 |
| 690,970 A | * | 1/1902 | Lewis | 43/82 |
| 866,862 A | * | 9/1907 | Hooker | 43/85 |
| 901,851 A | * | 10/1908 | Thompson | 43/85 |
| 940,877 A | * | 11/1909 | Janke | 43/85 |
| 1,046,799 A | * | 12/1912 | Kaufman | 43/85 |
| 1,199,901 A | * | 10/1916 | Keeffner | 43/81 |
| 1,528,647 A | * | 3/1925 | Anderson | 43/85 |
| 1,580,583 A | * | 4/1926 | Catlin | 43/85 |
| 1,616,552 A | * | 2/1927 | Rulison | 43/85 |
| 1,819,546 A | * | 8/1931 | Easton | 43/85 |
| 1,881,871 A | * | 10/1932 | Nerby | 43/85 |
| 1,981,785 A | * | 11/1934 | Donadei | 43/85 |
| 2,598,974 A | * | 6/1952 | Conrad | 43/80 |
| 2,723,486 A | * | 11/1955 | Bouma | 43/85 |
| 3,109,254 A | * | 11/1963 | Woodward | 43/85 |
| 3,161,984 A | * | 12/1964 | Martin | 43/85 |
| 3,408,765 A | * | 11/1968 | Caryl | 43/88 |
| 3,757,457 A | * | 9/1973 | Martin | 43/81 |
| 3,760,530 A | * | 9/1973 | Dahlgren | 43/88 |
| 4,005,542 A | * | 2/1977 | Anderson | 43/85 |
| 4,255,892 A | * | 3/1981 | Thebeau | 43/81 |
| 4,300,305 A | * | 11/1981 | King | 43/81 |
| 4,471,559 A | * | 9/1984 | Thebeau | 43/81 |
| 5,010,682 A | * | 4/1991 | Saccon | 43/81 |

FOREIGN PATENT DOCUMENTS

| | | | | |
|---|---|---|---|---|
| FR | 2537838 B1 | * | 6/1984 | |
| GB | 6846 B1 | * | of 1886 | 43/85 |
| GB | 22784 B1 | * | of 1907 | 43/85 |
| GB | 304828 B1 | * | 1/1929 | 43/81 |
| GB | 534996 B1 | * | 3/1941 | 43/85 |

* cited by examiner

Primary Examiner—Darren W. Ark
(74) Attorney, Agent, or Firm—Edward P. Dutkiewicz

(57) ABSTRACT

A small animal trap has a base. The first end of the base has a horizontal support bar and a pair of loops. A trapping spring has a first beam coupled between the loops of the base, a second beam with a fixed end and a free end, and a coil continuous with the first beam and the fixed end of the second beam and coupled to the second end of the bar. In an active state the trapping spring is compressed and when expanded it is at rest. A retention device coupled to the loop includes an activation fork with a hoop end and a pronged end and also includes a retention pin. The hoop end is adapted to hold the retention pin with the free end of the second beam and the pronged end extending into the loops.

3 Claims, 3 Drawing Sheets

SMALL ANIMAL TRAP SYSTEM

BACKGROUND OF THE INVENTION

1. Field of the Invention

The present invention relates to a small animal trap system and more particularly pertains to conveniently capturing target animals.

2. Description of the Prior Art

The use of animal traps of known designs and configurations is known in the prior art. More specifically, animal traps of known designs and configurations previously devised and utilized for the purpose of capturing target animals through conventional methods and apparatuses are known to consist basically of familiar, expected, and obvious structural configurations, notwithstanding the myriad of designs encompassed by the crowded prior art which has been developed for the fulfillment of countless objectives and requirements.

By way of example, U.S. Pat. No. 5,010,682 to Saccon issued Apr. 30, 1991, discloses an animal trap. U.S. Pat. No. 218,532, to W. C. Hooker issued Aug. 12, 1879, discloses an animal trap. U.S. Pat. No. 3,757,457 to Martin issued Sep. 11, 1973, discloses a humane animal trap. U.S. Pat. No. 3,161,984 to Martin issued Jul. 18, 1961, discloses an animal trap. Finally, U.S. Pat. No. 1,981,785 to Donadei issued Nov. 20, 1934, discloses a trap.

While these devices fulfill their respective, particular objectives and requirements, the aforementioned patents do not describe a small animal trap system that allows conveniently capturing target animals.

In this respect, the small animal trap system according to the present invention substantially departs from the conventional concepts and designs of the prior art, and in doing so provides an apparatus primarily developed for the purpose of conveniently capturing target animals.

Therefore, it can be appreciated that there exists a continuing need for a new and improved small animal trap system which can be used for conveniently capturing target animals. In this regard, the present invention substantially fulfills this need.

SUMMARY OF THE INVENTION

In view of the foregoing disadvantages inherent in the known types of animal traps of known designs and configurations now present in the prior art, the present invention provides an improved small animal trap system. As such, the general purpose of the present invention, which will be described subsequently in greater detail, is to provide a new and improved small animal trap system and method which has all the advantages of the prior art and none of the disadvantages.

To attain this, the present invention essentially comprises a base. The base is formed of metallic material. The base has a horizontal convex bar with a pair of sides, a first end and a second end. The first end has a horizontal support bar perpendicular to the convex bar. The first end also has a pair of vertical coinciding loops. Each loop has an apex. The loops extend upwardly from opposite sides of the convex bar.

A trapping spring is next provided. The trapping spring is formed of resilient metallic material. The trapping spring has a generally linear first beam coupled between the coinciding loops of the base. The trapping spring also has a generally linear second beam. The second beam has a fixed end and a free end. The free end is adapted to trap a small animal against the first end of the convex bar and a coil continuous with the first linear beam and the fixed end of the second linear beam. The coil is coupled to the second end of the convex bar and provides the force to the second linear beam enabling it to trap target animals. The trapping spring has an active state when the second linear beam is compressed adjacent to the first linear beam and the apex of the loops. The trapping spring has a resting state when the second linear beam expands to its natural state adjacent to the convex beam of the base.

Next provided is a retention device. The retention device is coupled to the pair of coinciding loops. The retention device includes an activation fork and a retention pin. The activation fork has a hoop end and a pronged end. The hoop end is adapted to hold the retention pin thereby holding the free end of the second linear beam and the pronged end extending into the loops. When a target animal passes through the loops and trips the pronged end, the retention pin will be freed causing the release of the free end of the second linear beam which is adapted to expand to its resting state thereby snapping against the convex bar of the base under the action of the coil.

Lastly, a locking device is provided. The locking device includes an aperture on the free end of the second linear beam. The locking device also includes a pair of apertures 54 on the respective loops adjacent to the apex. The locking device further includes a locking pin with a chain coupling the locking pin to the base to prevent losing the pin. The locking device is adapted to hold the system securely in the active state by passing the locking pin through all the respective apertures thereby allowing a user to safely transport the system.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims attached.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved small animal trap system which has all of the advantages of the prior art animal traps of known designs and configurations and none of the disadvantages.

It is another object of the present invention to provide a new and improved small animal trap system which may be easily and efficiently manufactured and marketed.

It is further an object of the present invention to provide a new and improved small animal trap system which is of durable and reliable constructions.

An even further object of the present invention is to provide a new and improved small animal trap system which is susceptible of a low cost of manufacture with regard to both materials and labor, and which accordingly is then susceptible of low prices of sale to the consuming public, thereby making such small animal trap system economically available to the buying public.

Even still another object of the present invention is to provide a small animal trap system for conveniently capturing target animals.

Lastly, it is an object of the present invention to provide a new and improved small animal trap having a base. The first end of the base has a horizontal support bar and a pair of loops. A trapping spring has a first beam coupled between the loops of the base, a second beam with a fixed end and a free end, and a coil continuous with the first beam and the fixed end of the second beam and coupled to the second end of the bar. In an active state the trapping spring is compressed and when expanded it is at rest. A retention device coupled to the loop includes an activation fork with a hoop end and a pronged end and also includes a retention pin. The hoop end is adapted to hold the retention pin with the free end of the second beam and the pronged end extending into the loops.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:.

The same reference numerals refer to the same parts throughout the various Figures.

DESCRIPTION OF THE PREFERRED EMBODIMENT

Figure 1:
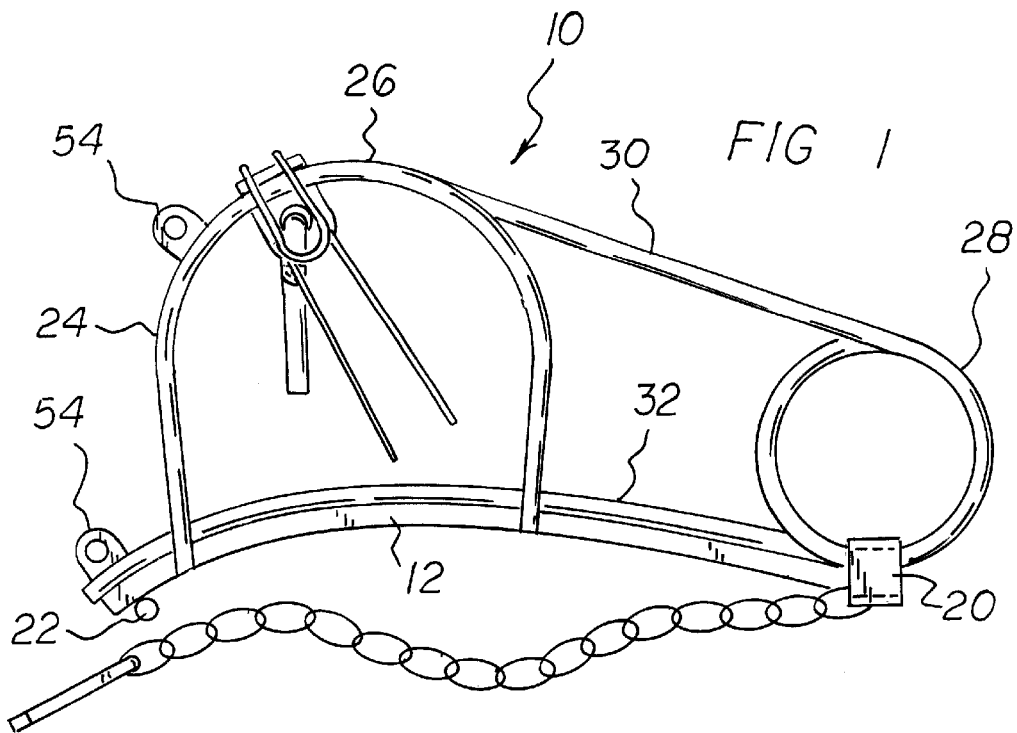
FIG. 1 is a front elevational view of the small animal trap system constructed in accordance with the principles of the present invention.
Figure 2:
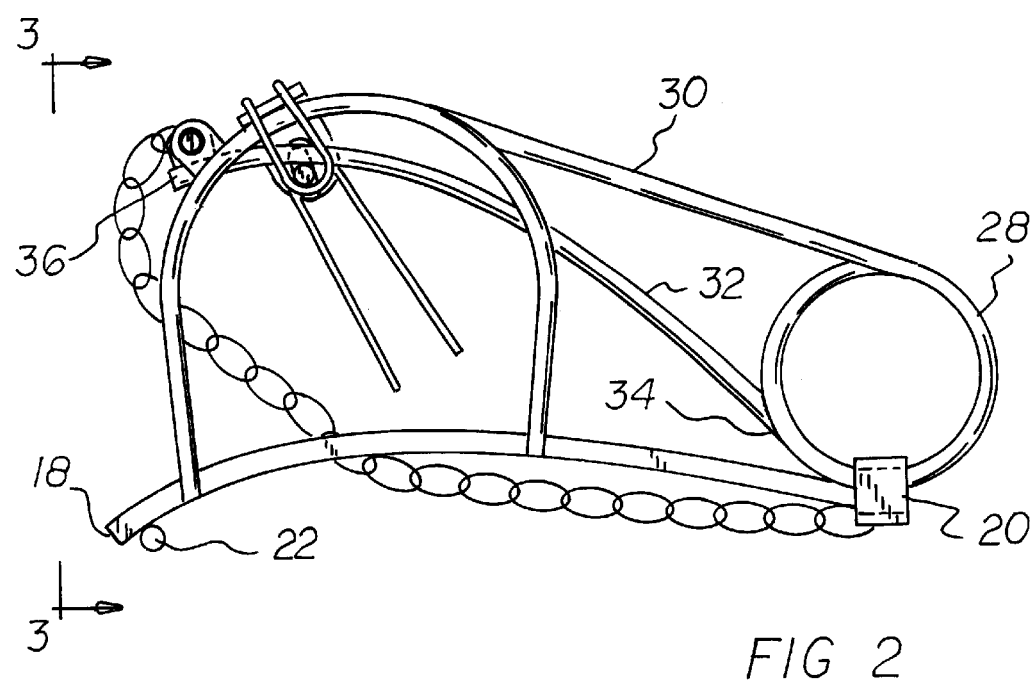
FIG. 2 is a front elevational view similar to FIG. 1 but illustrating the spring in the active state.
Figure 3:
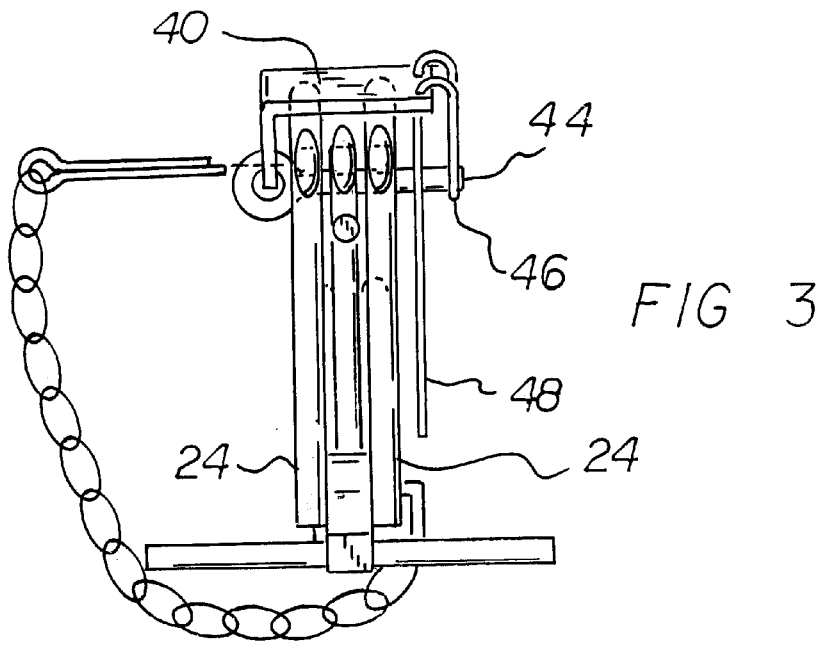
FIG. 3 is an end elevational view taken along line 3—3 of FIG. 2.
Figure 4:
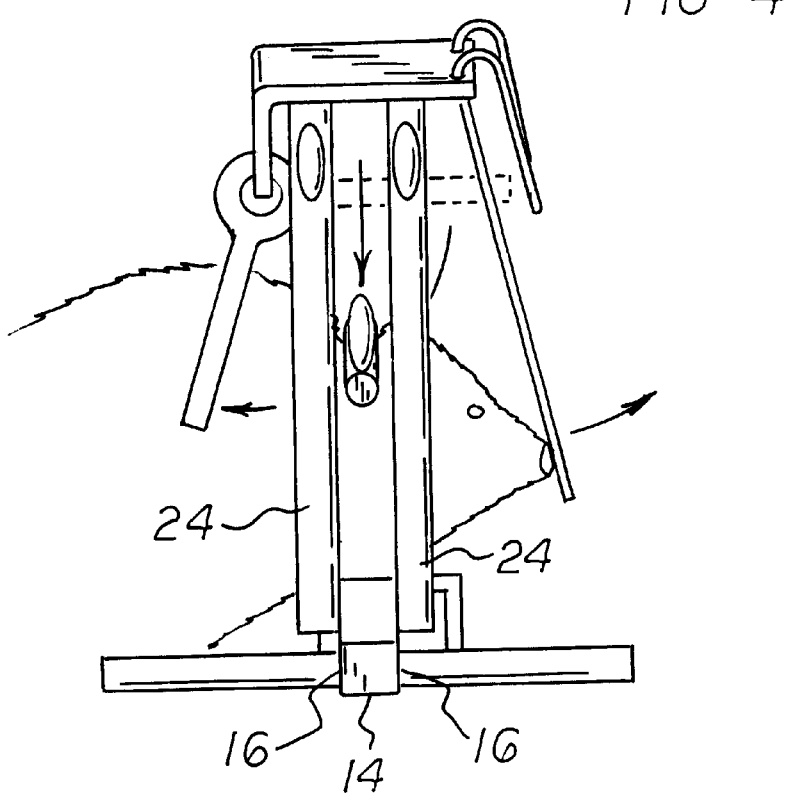
FIG. 4 is an end elevational view similar to FIG. 3 but illustrating the activation for being moved by the trapped animal.
Figure 5:
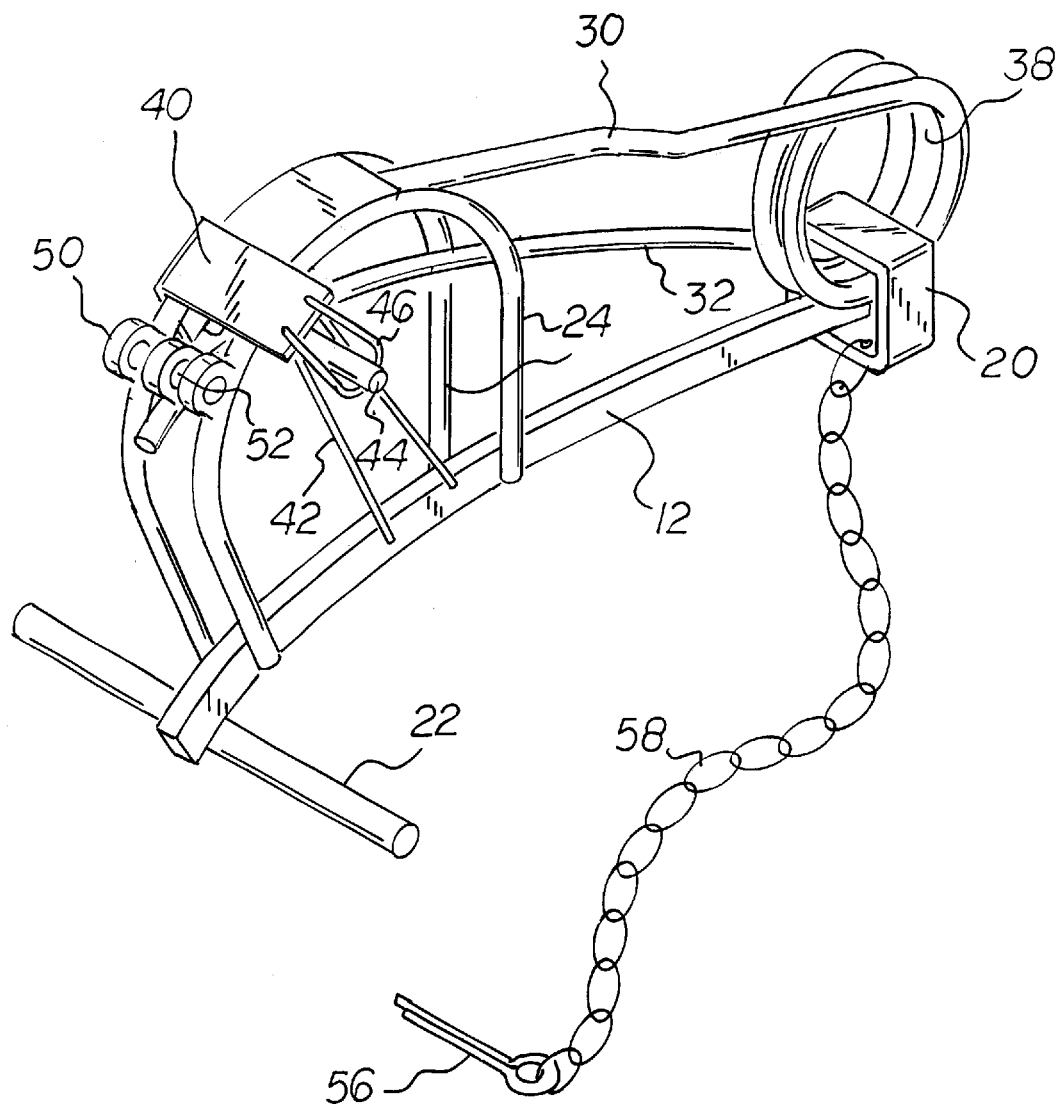
FIG. 5 is a perspective illustration of the small animal trap with the trapping spring in an active state.

With reference now to the drawings, and in particular to FIG. 1 thereof, the preferred embodiment of the new and improved small animal trap system embodying the principles and concepts of the present invention and generally designated by the reference numeral 10 will be described.

The present invention, the small animal trap system 10 is comprised of a plurality of components. Such components in their broadest context include a base, a trapping spring, and a retention device. Such components are individually configured and correlated with respect to each other so as to attain the desired objective.

First provided is a base 12. The base is formed of metallic material. The base has a horizontal convex bar 14 with a pair of sides 16, a first end 18 and a second end 20. The first end has a horizontal support bar 22 perpendicular to the convex bar. The first end also has a pair of vertical coinciding loops 24. Each loop has an apex 26. The loops extend upwardly from opposite sides of the convex bar.

A trapping spring 28 is next provided. The trapping spring is formed of resilient metallic material. The trapping spring has a generally linear first beam 30 coupled between the coinciding loops of the base. The trapping spring also has a generally linear second beam 32. The second beam has a fixed end 34 and a free end 36. The free end is adapted to trap a small animal against the first end of the convex bar and a coil 38 continuous with the first linear beam and the fixed end of the second linear beam. The coil is coupled to the second end of the convex bar and provides the force to the second linear beam enabling it to trap target animals. The trapping spring has an active state when the second linear beam is compressed adjacent to the first linear beam and the apex of the loops. The trapping spring has a resting state when the second linear beam expands to its natural state adjacent to the convex beam of the base.

Next provided is a retention device 40. The retention device is coupled to the pair of coinciding loops. The retention device includes an activation fork 42 and a retention pin 44. The activation fork has a hoop end 46 and a pronged end 48. The hoop end is adapted to hold the retention pin thereby holding the free end of the second linear beam and the pronged end extending into the loops. When a target animal passes through the loops and trips the pronged end, the retention pin will be freed causing the release of the free end of the second linear beam which is adapted to expand to its resting state thereby snapping against the convex bar of the base under the action of the coil.

Lastly, a locking device 50 is provided. The locking device includes an aperture 52 on the free end of the second linear beam. The locking device also includes a pair of apertures 54 on the respective loops adjacent to the apex. The locking device further includes a locking pin 56 with a chain 58 coupling the locking pin to the base to prevent losing the pin. The locking device is adapted to hold the system securely in the active state by passing the locking pin through all the respective apertures thereby allowing a user to safely transport the system.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by letters patent of the United States is as follows:

1. A small animal trap comprising:

a base having a horizontal bar with a pair of sides, a first end and a second end with the first end having a horizontal support bar, the first end also having a pair of loops;

a trapping spring having a first beam coupled between the loops of the base, a second beam having a fixed end and a free end and a coil continuous with the first beam and the fixed end of the second beam, the coil further being coupled to the second end of the bar, the trapping spring having an active state when it is compressed with the free end of the second beam raised from the base in anticipation of trapping an animal and a resting state when it is expanded with the free end of the second beam lowered to a location adjacent to the base for holding a trapped animal; and a retention device coupled to the pair of loops and including an activation fork and a retention pin, the activation fork having a hoop end and a pronged end with the hoop end adapted to hold the retention pin thereby holding the free end of the second beam and the pronged end pivotable away from the loops due to contact by an animal for allowing movement of the second beam and trapping of an animal.

2. The trap as set forth in claim 1 and further including a locking device including an aperture on the free end of the second beam, a pair of apertures on the respective loops and a locking pin with a chain coupling the locking pin to the base to prevent losing the pin, the locking device being adapted to hold the trap securely in the active state by passing the locking pin through all the respective apertures thereby allowing a user to safely transport the trap.

3. A small animal trap system for the capturing of unwanted animals comprising, in combination:

a base formed of metallic material having a horizontal convex bar with a pair of sides, a first end and a second end with the first end having a horizontal support bar perpendicular to the convex bar, the first end also having a pair of vertical coinciding loops each having an apex and extending upwardly from a respective one of the sides of the convex bar;

a trapping spring formed of resilient metallic material having a generally linear first beam coupled between the coinciding loops of the base, a generally linear second beam having a fixed end and a free end with the free end being adapted to trap a small animal against the first end of the convex bar and a coil continuous with the first linear beam and the fixed end of the second linear beam, the coil further being coupled to the second end of the convex bar and providing the force to the second linear beam enabling it to trap unwanted animals, the trapping spring having an active state when the second linear beam is compressed adjacent to the first linear beam and the apex of the loops and a resting state when the second linear beam expands to its natural state adjacent to the convex beam of the base;

a retention device coupled to the pair of coinciding loops and including an activation fork and a retention pin, the activation fork having a hoop end and a pronged end with the hoop end adapted to hold the retention pin thereby holding the free end of the second linear beam and the pronged end extending into the loops, when an unwanted animal passes through the loops and trips the pronged end the retention pin will be freed causing the release of the free end of the second linear beam which is adapted to expand to its resting state thereby snapping against the convex bar of the base under the action of the coil; and a locking device including an aperture on the free end of the second linear beam, a pair of apertures on the respective loops adjacent to the apex and a locking pin with a chain coupling the locking pin to the base to prevent losing the pin, the locking device being adapted to hold the system securely in the active state by passing the locking pin through all the respective apertures thereby allowing a user to safely transport the system.

\* \* \* \* \*